United States Patent
Walsh et al.

(10) Patent No.: US 11,403,073 B2
(45) Date of Patent: Aug. 2, 2022

(54) SYSTEM AND METHOD FOR ENABLING COMMUNICATION BETWEEN DISPARATE COMPUTER LANGUAGES BY SHARING OBJECTS

(71) Applicant: MZ IP Holdings, LLC, Palo Alto, CA (US)

(72) Inventors: Matt Walsh, San Carlos, CA (US); Tim Z Andersen, Gilroy, CA (US)

(73) Assignee: MZ IP Holdings, LLC, Palo Alto, CA (US)

(*) Notice: Subject to any disclaimer, the term of this patent is extended or adjusted under 35 U.S.C. 154(b) by 0 days.

(21) Appl. No.: 16/436,071

(22) Filed: Jun. 10, 2019

(65) Prior Publication Data
US 2019/0384579 A1    Dec. 19, 2019

Related U.S. Application Data

(60) Provisional application No. 62/684,399, filed on Jun. 13, 2018.

(51) Int. Cl.
*G06F 8/30* (2018.01)
*G06F 9/50* (2006.01)

(52) U.S. Cl.
CPC .......... *G06F 8/315* (2013.01); *G06F 9/5016* (2013.01)

(58) Field of Classification Search
None
See application file for complete search history.

(56) References Cited

U.S. PATENT DOCUMENTS

| | | | |
|---|---|---|---|
| 5,890,158 A * | 3/1999 | House | G06F 40/151 |
| 5,963,958 A * | 10/1999 | Cottrill | G06F 8/30 |
| 6,275,868 B1 | 8/2001 | Fraley et al. | |
| 6,609,158 B1 | 8/2003 | Nevarez et al. | |
| 9,569,356 B1 * | 2/2017 | Wei | G06F 9/3834 |
| 9,582,300 B2 | 2/2017 | Martori et al. | |
| 10,162,690 B2 | 12/2018 | O'Connor et al. | |
| 10,706,051 B1 * | 7/2020 | Wei | G06F 16/24552 |

(Continued)

FOREIGN PATENT DOCUMENTS

| | | |
|---|---|---|
| EP | 2101474 A1 | 9/2009 |
| WO | WO-2014/065826 A1 | 5/2014 |
| WO | WO-2016/176058 A1 | 11/2016 |

OTHER PUBLICATIONS

Int'l Search Report and Written Opinion of the ISA/EP in PCT/US2019/036270; dated Aug. 2, 2019; 12 pgs.

(Continued)

*Primary Examiner* — Qing Chen
(74) *Attorney, Agent, or Firm* — Goodwin Procter LLP

(57) ABSTRACT

A method, a system, and an article are provided for enabling communication between disparate computer languages. An example computer-implemented method includes: providing on a computing device (i) a first environment supporting a first computer language and (ii) a second environment supporting a second computer language different from the first computer language; providing an instance of an instantiated class definition as an object; accessing the object from both the first environment and the second environment; and deleting the object once a reference count indicates that the object is no longer being accessed by the first environment and the second environment.

18 Claims, 5 Drawing Sheets

(56) References Cited

U.S. PATENT DOCUMENTS

| | | | |
|---|---|---|---|
| 2002/0087590 A1* | 7/2002 | Bacon | G06F 12/0261 |
| 2002/0178141 A1 | 11/2002 | Kushnirskiy | |
| 2003/0056203 A1* | 3/2003 | Micco | G06F 8/447 |
| | | | 717/137 |
| 2003/0105883 A1 | 6/2003 | Gibbons | |
| 2003/0225935 A1 | 12/2003 | Rivard et al. | |
| 2005/0033781 A1* | 2/2005 | Dussud | G06F 12/0269 |
| 2005/0183078 A1 | 8/2005 | Shi et al. | |
| 2006/0059453 A1* | 3/2006 | Kuck | G06F 12/0253 |
| | | | 717/100 |
| 2006/0200808 A1 | 9/2006 | Kalidindi et al. | |
| 2006/0259489 A1* | 11/2006 | Bernabeu-Auban | G06F 9/465 |
| 2008/0127301 A1* | 5/2008 | Voellm | G06F 21/53 |
| | | | 726/2 |
| 2012/0290629 A1* | 11/2012 | Beaverson | G06F 16/137 |
| | | | 707/827 |
| 2012/0303704 A1 | 11/2012 | Schleifer et al. | |
| 2012/0317586 A1* | 12/2012 | Clevenger | G06F 9/46 |
| | | | 719/313 |
| 2013/0318132 A1* | 11/2013 | Basu | G06F 12/0276 |
| | | | 707/816 |
| 2015/0080128 A1* | 3/2015 | Terrell, IV | G06F 9/44505 |
| | | | 463/31 |
| 2015/0331727 A1 | 11/2015 | Mameri et al. | |
| 2016/0057217 A1* | 2/2016 | Beaverson | G06F 16/183 |
| | | | 707/827 |
| 2016/0283492 A1 | 9/2016 | Duminy et al. | |
| 2017/0344468 A1* | 11/2017 | Kirshenbaum | G06F 12/023 |
| 2018/0232304 A1* | 8/2018 | Wang | G06F 12/0261 |
| 2018/0260255 A1* | 9/2018 | Yazdani | G06F 9/524 |
| 2018/0375935 A1* | 12/2018 | Squires | G06F 15/17331 |

OTHER PUBLICATIONS

Jung, K.; Brown, A., "Beginning Lua Programming" (2007), Wiley Publishing Inc., pp. 1-644.
Int'l Search Report and Written Opinion of the ISA/EP in PCT/US2018/015036; dated Apr. 23, 2018; 15 pgs.
Palozzi, L., "Lua: Technical Note 5—a Template Class for Binding C++ to Lua," Mar. 12, 2003, 6 pgs, available at: Hyperlink "https://www.lua.org/notes/ltn005.html" https://www.lua.org/notes/ltn005.html.
Vaswani, Vikram, "PHP: A Beginner's Guide" In: "PHP: A Beginner's Guide," Oct. 2009, McGraw-Hill Education.

* cited by examiner

SYSTEM AND METHOD FOR ENABLING COMMUNICATION BETWEEN DISPARATE COMPUTER LANGUAGES BY SHARING OBJECTS

CROSS-REFERENCE TO RELATED APPLICATIONS

This application claims the benefit of U.S. Provisional Patent Application No. 62/684,399, filed Jun. 13, 2018, the entire contents of which are incorporated by reference herein.

BACKGROUND

The present disclosure relates to communications between two or more computer languages and, in some examples, to systems and methods for enabling communication on a computing device between disparate computer language environments.

In general, it can be desirable to communicate between computer programs written in different languages. In some instances, for example, a program written in one language may be required to obtain information from or send information to another program written in a different language. One of the programs in such an instance can operate or provide certain functions or features (e.g., a database) for the other program.

In object-oriented programming (OOP), an object can be a data structure that includes data and one or more methods or functions that can operate on the data. OOP computer programs can be configured to include multiple objects that interact with one another. The most popular OOP languages are class-based, such that objects can be instances of classes, which can determine the object types.

SUMMARY

In general, the systems and methods described herein relate to communications between computer programs written in different computer languages. A computing device, such as a server computer or a client computer, can be operated to have a first computer language in a first environment and a second computer language in a second environment. One or both of the environments can create an object, for example, by providing an instance of an instantiated class definition. Both environments are able to access the object, for example, to determine a status of the object, send or receive data to or from the object, and/or perform a method or function associated with the object. Once both of the environments are no longer accessing the object or have no need to access the object, the object can be removed or deleted or can dispose of itself automatically.

Advantageously, the systems and methods can enable two programming language environments to communicate with one another, exchange information, and share objects. For example, the first environment (e.g., a Lua environment) can send a request to the second environment to instantiate or create an object. The second environment (e.g., a C++ environment) can create the object and can access the object to monitor a status of the object or manipulate the object. The first environment can also access the object (e.g., at the same time), for example, to check the status of the object or change a condition of the object. Both environments can perform a method associated with the object. For example, when the second environment determines that an event associated with the object has occurred, the first environment can be informed of the occurrence of the event and can perform a method or execute a callback function associated with the object. In preferred examples, the object can be recognizably typed by both environments, with members and methods of the object accessible to both environments. Both environments can interact with the object directly and/or in response to an event.

In one aspect, the subject matter described in this specification relates to a computer-implemented method. The method includes: providing on a computing device (i) a first environment supporting a first computer language and (ii) a second environment supporting a second computer language different from the first computer language; providing an instance of an instantiated class definition as an object; accessing the object from both the first environment and the second environment; and deleting the object once a reference count indicates that the object is no longer being accessed by the first environment and the second environment.

In certain examples, the computing device can include a client device for an online game or a server for an online game. The first computer language can be or include a programming language and the second computer language can be or include a scripting language. Providing the object can include: using the first environment to allocate memory for the object; and sending a memory address for the object from the first environment to the second environment. Accessing the object can include accessing an identical memory address for the object from both the first environment and the second environment. Accessing the object can include identifying the object as a specific type from both the first environment and the second environment.

In some instances, the step of providing the instance of the instantiated class definition can be performed from one of the first environment and the second environment, and the step of accessing the object can be performed from a different one of the first environment and the second environment. Accessing the object can include: using the first environment to determine that an event associated with the object has occurred; using the first environment to inform the second environment about the occurrence of the event; and executing a callback function in the second environment in response to the occurrence of the event. The reference count can include a number of at least one of references, pointers, or handles to the object from the first environment and the second environment. Deleting the object can include constructing a handles dictionary using a memory address for the object as a key.

In another aspect, the subject matter described in this specification relates to a system. The system includes one or more computer processors programmed to perform operations including: providing on a computing device (i) a first environment supporting a first computer language and (ii) a second environment supporting a second computer language different from the first computer language; providing an instance of an instantiated class definition as an object; accessing the object from both the first environment and the second environment; and deleting the object once a reference count indicates that the object is no longer being accessed by the first environment and the second environment.

In certain implementations, the computing device can include a client device for an online game or a server for an online game. The first computer language can be or include a programming language and the second computer language can be or include a scripting language. Providing the object can include: using the first environment to allocate memory for the object; and sending a memory address for the object from the first environment to the second environment. Accessing the object can include accessing an identical memory address for the object from both the first environment and the second environment. Accessing the object can include identifying the object as a specific type from both the first environment and the second environment.

In some examples, the step of providing the instance of the instantiated class definition can be performed from one of the first environment and the second environment, and the step of accessing the object can be performed from a different one of the first environment and the second environment. Accessing the object can include: using the first environment to determine that an event associated with the object has occurred; using the first environment to inform the second environment about the occurrence of the event; and executing a callback function in the second environment in response to the occurrence of the event. The reference count can include a number of at least one of references, pointers, or handles to the object from the first environment and the second environment. Deleting the object can include constructing a handles dictionary using a memory address for the object as a key.

In another aspect, the subject matter described in this specification relates to an article. The article includes a non-transitory computer-readable medium having instructions stored thereon that, when executed by one or more computer processors, cause the one or more computer processors to perform operations including: providing on a computing device (i) a first environment supporting a first computer language and (ii) a second environment supporting a second computer language different from the first computer language; providing an instance of an instantiated class definition as an object; accessing the object from both the first environment and the second environment; and deleting the object once a reference count indicates that the object is no longer being accessed by the first environment and the second environment.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims

DETAILED DESCRIPTION

Figure 1:
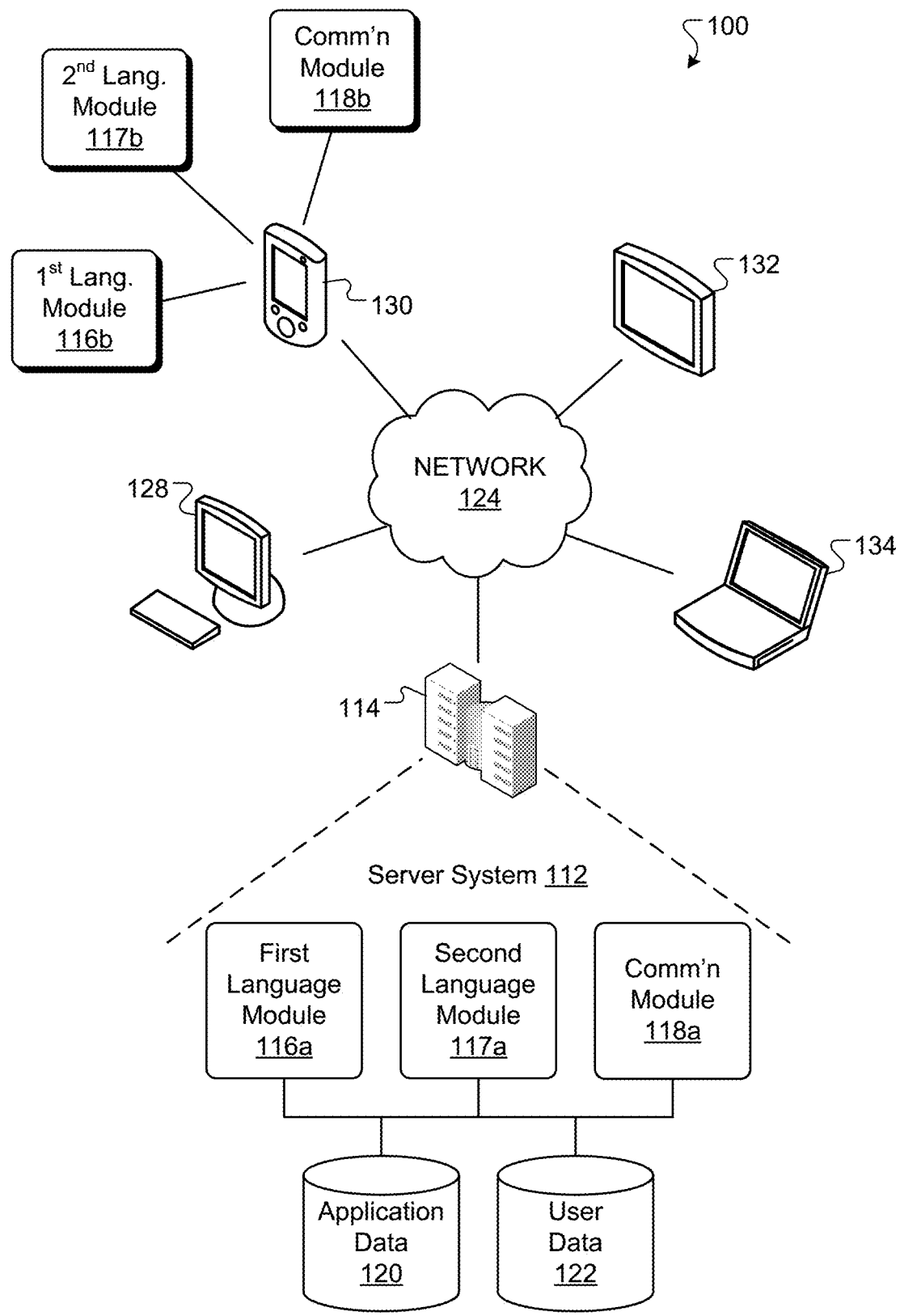
FIG. 1 is a schematic diagram of an example system for enabling communications between disparate computer languages on one or more computing devices.

The development and execution of online games, including mobile games (e.g., massively multiplayer online games), can involve parallel access to game engine systems and objects from two different computer languages (e.g., C++ and Lua). The application can be or include, for example, a C++ compiled executable that implements the game systems, such as a container for pending timers. The game content or portion thereof can be downloaded to a client device upon connection to a server. Such content can include instructions interpreted at runtime, which can be in the form of scripts written in, for example, Lua or other suitable scripting language, such as a function to execute when a timer has expired. Thus, one of the languages (e.g., C++) can be statically compiled to create the application, while the other language (e.g., Lua) can be used to provide additional information and/or computational instructions dynamically. While references to specific computer languages (e.g., C++ and Lua) are made throughout this description, it is understood that other computer languages, in various combinations, can be used. Additionally, while the present invention can be used with online games and other like applications, the present invention can be used in and with any suitable application client that incorporates and uses multiple disparate computer languages to develop and execute the application client. In certain examples, a data "type" can be a type of data that a variable can store, such as, for example, integer, character, Boolean, floating point, and the like. A "class" can be, for example, a user-defined data type that has its own members and member functions, which can be used or accessed by generating an instance of the class. The instance of the class can be referred to as an "object." An "object" can be, for example, a data structure that includes (i) data and/or (ii) functions that can operate on or be applied to data or a data structure.

In certain examples, the systems and methods described herein are directed to a software engineered solution that can allow two programming language environments access to an instance of an instantiated or instantiable class definition (e.g., a C++ object). The object can be identifiable as a specific type or class from both environments (e.g., C++ and Lua), and members and methods as per the class definition can be accessible from both environments, in that a memory address for the object can be identical for both environments. Communications between the two environments can be implemented using a communication layer or module, as described herein, which is preferably implemented in one of the languages used for the two environments (e.g., C++). The method, while called directly from a game engine environment (e.g., in C++), can also be identically called from a game manager environment (e.g., in Lua), for example, by registering a wrapper function (e.g., a lambda expression or closure) that calls the same method by casting the memory address to its C++ type.

The systems and methods described herein can utilize or provide various features. For example, memory allocation (e.g., of objects) can be performed through registration of a C++ type or class, so that the type or class can be instantiated into objects. The memory allocation can indicate that the type or class is or includes, for example, a date, a time, an integer, a floating point number, or a character. The constructed object can be returned to a Lua scripting environment, with multiple inheritance support. This way, when the Lua environment is asking for an integer (or other number or character format), C++ can know what Lua is requesting and can provide the requested information. Likewise, when registered functions (e.g., in Lua) execute, type safety can be used to ensure that parameters passed into the functions match the types established at registration time. This can prevent an object from exhibiting inappropriate or unauthorized characteristics or behavior (e.g., a virtual cat should not "bark"). When a language environment passes an incorrect or incompatible parameter to a function or object, for example, the language environment can be informed of the error. In some examples, a registered function can be a function in one language (e.g., C++) that has been registered or prepared for use in another language (e.g., Lua). While a C++ program may have thousands of functions, for example, only a subset of the functions may be registered or exposed to be called by Lua (or other scripting language). The registration process can run code that registers the subset of C++ functions for Lua access. C++ functions that are not registered may not be reachable by Lua (e.g., directly).

Additionally or alternatively, the systems and methods described herein can utilize a type hierarchy that allows C++ types to be accessed from Lua using single and multiple inheritance features that mimic the organization of native C++ types. For example, the language environments can create and access objects that represent user interface (UI) elements. These elements can have different shapes (e.g., round, square, etc.), colors, or other characteristics, and some elements may be clickable while others are not clickable. In such an instance, while all elements may belong to a base class of UI elements, the elements may be organized by or fall within a type hierarchy (e.g., according to shape, color, clickable, etc.) within the base class. In general, a "class" can define the common properties of the various types of objects that belong to the class. In an example involving multiple inheritance features, a first UI base class can define an object's visual representation (e.g., color, texture, and/or shape), while a second UI base class can define the object's behavior (e.g., clickable and/or toggleable). An instance of a UI object or element (e.g., for a multiplayer online game) can inherit features from both of these UI base classes, for complete functionality within the two language environments.

Additionally or alternatively, instance method and property registration can be implemented and used to allow a C++ object to be manipulated from Lua. For example, a C++ object representing a virtual apple can be manipulated by Lua to change one or more characteristics of the apple. For example, when a bite is taken out of the apple, Lua can modify a size, shape, and/or weight of the apple. Further, both language environments can use and recognize class functions and class property registration.

Additionally or alternatively, reference counting and/or garbage collection systems can be coordinated among the language environments. This allows objects to automatically dispose of themselves once the language environments no longer have any references to the objects, such that the objects have been orphaned or are no longer accessible or being accessed by the environments. Further, the systems and methods can utilize reflection of registered types, including inheritance and dictionaries of registered properties, to provide enhanced debugging and/or programmer assistance capabilities. For example, one of the language environments can ask an object what it is and can receive a reflection with the answer from the other language environment.

In various implementations, the systems and methods described herein can be used to construct objects that are maintained by the game engine in a first language environment (e.g., C++). The objects may be made available to be queried or modified by a game manager in a second language environment (e.g., Lua), and methods associated with the objects can be executed. The systems and methods can be used to inform one or both of the language environments about any results an object is designed to deliver, as the object performs its prescribed operation or task. Further, empirical values are preferably maintained between the two language environments (e.g., Lua and C++), even when the two language environments utilize different storage formats. For example, when a date will be stored in C++ but referenced or accessed from Lua, C++ may store the date internally as a floating point number (e.g., "1.234e9") while Lua may store the date as a string (e.g., "Mar. 5, 2019"). The empirical value for the date can be maintained by storing the date in the C++ format and ensuring that the date is accessible to Lua in the Lua format. The systems and methods can ensure that each object's class type is maintained in both environments, such that when an object is read or manipulated, the object's storage can remain intact and the object's methods can be called correctly.

FIG. 1 illustrates an example system 100 for enabling communications between disparate computer languages on one or more computing devices. A server system 112 provides functionality for providing environments that support two or more disparate computer languages and for enabling communications between the languages. The server system 112 includes software components and databases that can be deployed at one or more data centers 114 in one or more geographic locations, for example. The server system 112 software components can include a first language module 116a, a second language module 117a, and a communication module 118a. The software components can include sub-components that can execute on the same or on different individual data processing apparatus. The server system 112 databases can include an application data 120 database and a user data 122 database. The databases can reside in one or more physical storage systems. The software components and data will be further described below.

An application, such as, for example, a web-based application, can be provided as an end-user application to allow users to interact with the server system 112. The end-user application can be accessed through a network 124 (e.g., the Internet) by users of client devices, such as a personal computer 128, a smart phone 130, a tablet computer 132, and a laptop computer 134. Other client devices are possible. Each client device can include suitable software components and storage devices or databases for providing application functionality. The client device software components can include, for example, a first language module 116b, a second language module 117b, and a communication module 118b. While FIG. 1 depicts the first language module 116b, the second language module 117b, and the communication module 118b as being associated with the client device 130, it is understood that each of the client devices 128, 130, 132, and 134 can include the first language 116b, the second language module 117b, the communication module 118b, or any portions thereof. In some implementations, the application data 120 and/or the user data 122 or any portions thereof can be stored on one or more client devices.

FIG. 1 depicts the first language module 116a, the second language module 117a, and the communication module 118a as being able to communicate with the databases (e.g., the application data 120 and the user data 122 databases). The application data 120 database generally includes data related to a software application installed on a client device and/or the server system 112. The software application can be or include the web-based or end-user application, described herein, and/or can provide or relate to, for example, music, video, computer games, news, maps, weather, and the like. In the context of a computer game application, for example, the application data 120 database can include information related to a virtual environment for the game, image, video and/or audio data for the game, event data corresponding to previous, current or future game events, and/or game state data defining a current state of the game. The user data 122 database generally includes data related to user interactions with the software application. Such information can be or include, for example, a history of user connections to the system 100, user purchases, user accomplishments, user preferences, user tasks, and/or user interactions with other users (e.g., group chats).

In various examples, the software application can be implemented on the server system 112 and the client devices 128, 130, 132, and 134 using the first language modules 116a and 116b, respectively, and the second language modules 117a and 117b, respectively. When the software application provides a computer game, for example, the first language modules 116a and 116b can provide an engine for the game. The game engine can perform functions in the game similar to those of an operating system, such as, for example, presenting images, sounds, and other content, managing user inputs (e.g., in-app purchases), setting timers for delayed actions, detecting screen inputs, and the like. In a typical example, the first language modules 116a and 116b can be or include a compiled computer program written in a low-level language or a compiled language, such as, for example, C, C++, ERLANG, or PASCAL. Other computer languages can be used. The second language modules 117a and 117b can provide a game manager that manages rules and content for the game and/or controls how and when various game features are presented. The second language modules 117a and 117b can be or include an interpreted computer program written in a high-level language or a scripting language, such as, for example, Lua, PHP, JAVASCRIPT, PERL, or PYTHON. Other computer languages can be used.

Advantageously, use of a scripting language (e.g., Lua) can make the software application adaptable and flexible. Unlike the compiled language, which can be difficult or time-consuming to change, recompile, and distribute to servers and/or user devices, the scripting language can be updated regularly or frequently and redistributed with less difficulty (e.g., upon application start-up). Game managers can revise or update content, rules, or other game features by making changes in the scripting language environment. These changes can be communicated to the compiled language environment using the systems and methods described herein. This allows changes to be made to the game or other software application without having to make changes in the compiled language environment. For example, when a change is made to a compiled application, a user of the application may be forced to stop a current version of the application, download and install a new version of the application, and then restart the application. By contrast, scripted instructions can be downloaded automatically, while the application is actively running, with little or no user interaction.

Figure 2:
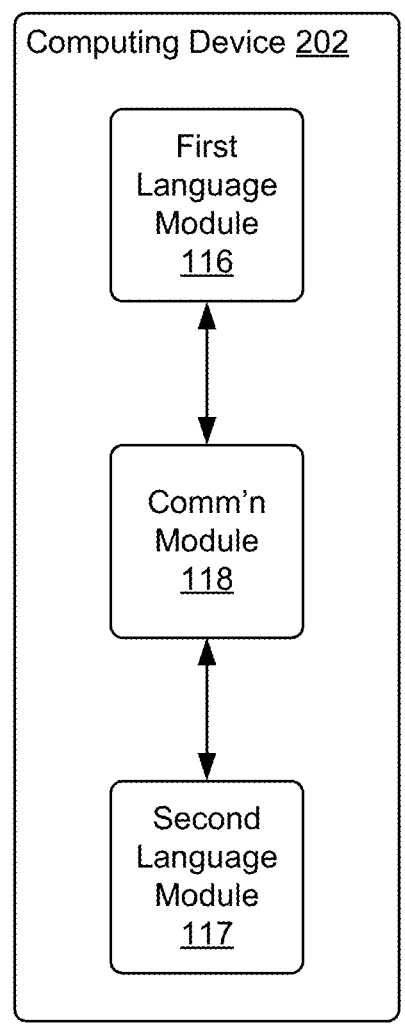
FIG. 2 is a schematic diagram of an example system for enabling communications between disparate computer languages on a computing device.

The communication modules 118a and 118b can be implemented on the server system 112 and client devices, respectively, and can enable or facilitate communications between the first language modules 116a and 116b and the second language modules 117a and 117b, as described herein. For example, referring to FIG. 2, a communication module 118 (e.g., the communication module 118a or 118b) on a computing device 202 (e.g., the server system 112 or a client device) can serve as a layer between a first language module 116 (e.g., the first language module 116a or 116b) and a second language module 117 (e.g., the second language module 117a or 117b). The communication module 118 can transmit requests and exchange information between the first language module 116 and the second language module 117. In various examples, the communication module 118 can be used to implement objects that both the first language module 116 and the second language module 117 can access. Such objects can be deleted or removed once the objects are no longer being accessed by the first language module 116 and/or the second language module 117.

Referring again to FIG. 1, the software application implemented on the server system 112 is preferably identical or similar to the software application implemented on the client devices 128, 130, 132, and 134. For example, in the context of a multiplayer online game, the server system 112 and the client devices 128, 130, 132, and 134 can be configured to run identical or similar versions of the online game. In some instances, however, the first language modules 116a and 116b or the second language modules 117a and 117b can be implemented using different computer languages and/or can implement the software applications using different computer languages. For example, the first language module 116a on the server system 112 can be implemented using a first computer language, and the first language module 116b on the client devices 128, 130, 132, and 134 can be implemented using a second computer language. Example computer languages include, for example, PHP, Lua, C, C++, ERLANG, PYTHON, PASCAL, PERL, JAVA, RUBY, JAVASCRIPT, C#, OBJECTIVE-C, and SQL. Many other computer languages are possible. In one preferred example, the first language modules 116a and 116b are implemented in C++ and the second language modules 117a and 117b are implemented in Lua. The communication modules 118a and 118b are preferably written in the same language used for the first language modules 116a and 116b, which can be, for example, C++. Alternatively, the communication modules 118a and 118b can be written in the same language used for the second language modules 117a and 117b or can be written in a language that is not used for either the first language modules 116a and 116b or the second language modules 117a and 117b.

Figure 3:
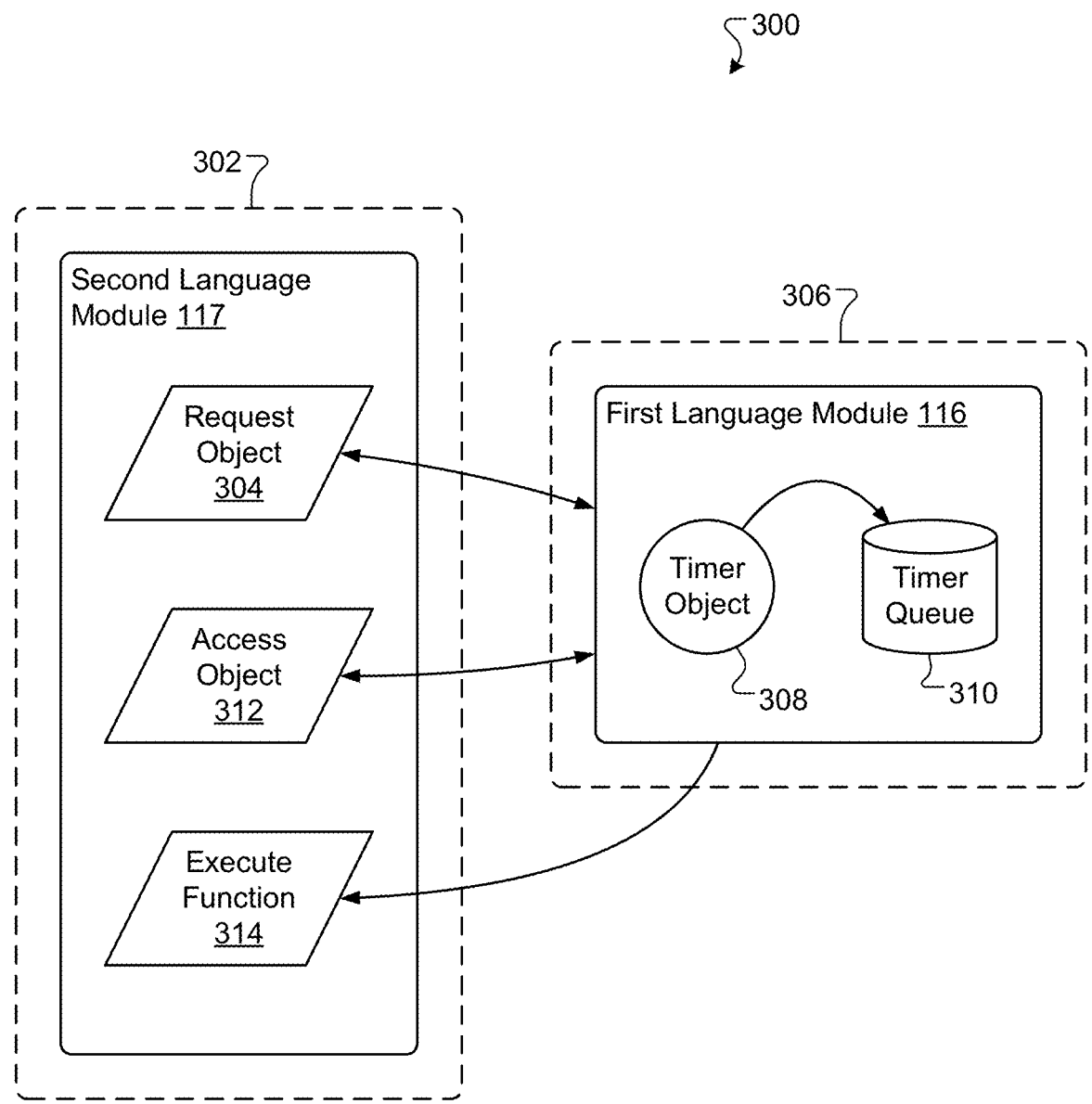
FIG. 3 is a schematic diagram of an example method of communicating between disparate computer languages on a computing device.

FIG. 3 illustrates an example method 300 of creating and using a timer object. Using the second language module 117, a Lua environment 302 can request (step 304) creation of a timer object (or other object) through suitable Lua code such as, for example, the following:

```
local t = ix.Timer(5, true)
t.onTimer:addListener (
    function( )
        print("Timer ended")
    end
) .
```

This can cause a C++ environment 306, implemented using the first language module 116, to instantiate a C++ timer object 308 using parameters "5" and "true." Once created, the timer object 308 can be added to a timer queue 310 managed by the first language module 116 (e.g., the C++ code engine). The Lua environment 302 can access (step 312) or query the timer object 308, for example, to determine a state of the timer and/or cancel a recurring timer. When the timer object 308 expires (e.g., after 5 seconds in this example), the Lua environment 302 can receive a "Timer over" notification in the form of a registered callback function, and the Lua environment 302 can execute (step 314) the callback function and/or other function associated with the object. The timer object 308, in preferred examples, can execute one or more functions from the first language module 116 and/or the second language module 117.

For example, in the context of a computer game, the Lua environment can act as a game manager and the callback function can cause the Lua environment to take an action in the game. When the timer expires, for example, the Lua environment can introduce content into the game, in the form of images, sounds (e.g., explosion sound), and/or video. For example, in the context of a battle game, a "fuse" timer can be started when a virtual grenade is thrown, and a function to trigger an explosion can be executed when the fuse timer expires. Additionally or alternatively, the Lua environment can implement a new rule, a new game phase, a new challenge, a reward, and/or other features into the game. Other types of action can be triggered by the callback function, some of which may or may not be readily apparent to players of the game.

In various examples involving Lua and C++ environments, the systems and methods described herein can utilize Lua metatables and/or Lua's _call, _index, and/or _gc metamethods. A Lua metatable, in general, can be used to set or change the behavior of a Lua table, which can implement associative arrays. Additionally, the _call metamethod can be used to make a table act like a function, the _index metamethod can use a fallback table or run a custom function when a key in a table does not exist, and/or the _gc metamethod can be used to dispose of old objects that are no longer being used. In various examples, a C++ registration object can be utilized for each C++ type that maintains a dictionary of functions (often implemented as lambda expressions or "closures"). For example, when C++ has a type for "Date," a registration object can be created for the Date type itself. The C++ Date type can have or be associated with methods such as "setDate" (e.g., to define a date) or "getDate" (e.g., to retrieve a date). To access the "setDate" method from Lua, the registration object for the Date type can have a dictionary in which the key can be a string "setDate" (which Lua will use to refer to the function) and the value can be a lamba expression that calls the C++ Date's "setDate" actual function call. Additionally or alternatively, an event handler can be used that allows callback functions to be added from either environment. The event handler can be a method that is tied to an event, such that the method is called when the event occurs. For example, an event handler can be used to take an action (e.g., present content, open a file, etc.) when a user clicks a button or virtual object. Many other methods and events are possible. In some examples, a dictionary can be or include a collection of lambda expressions, which can be keyed by a method or property name. The dictionary can be accessed as part of a single closure, for example, bound to an _index metamethod for a class table.

Figure 4:
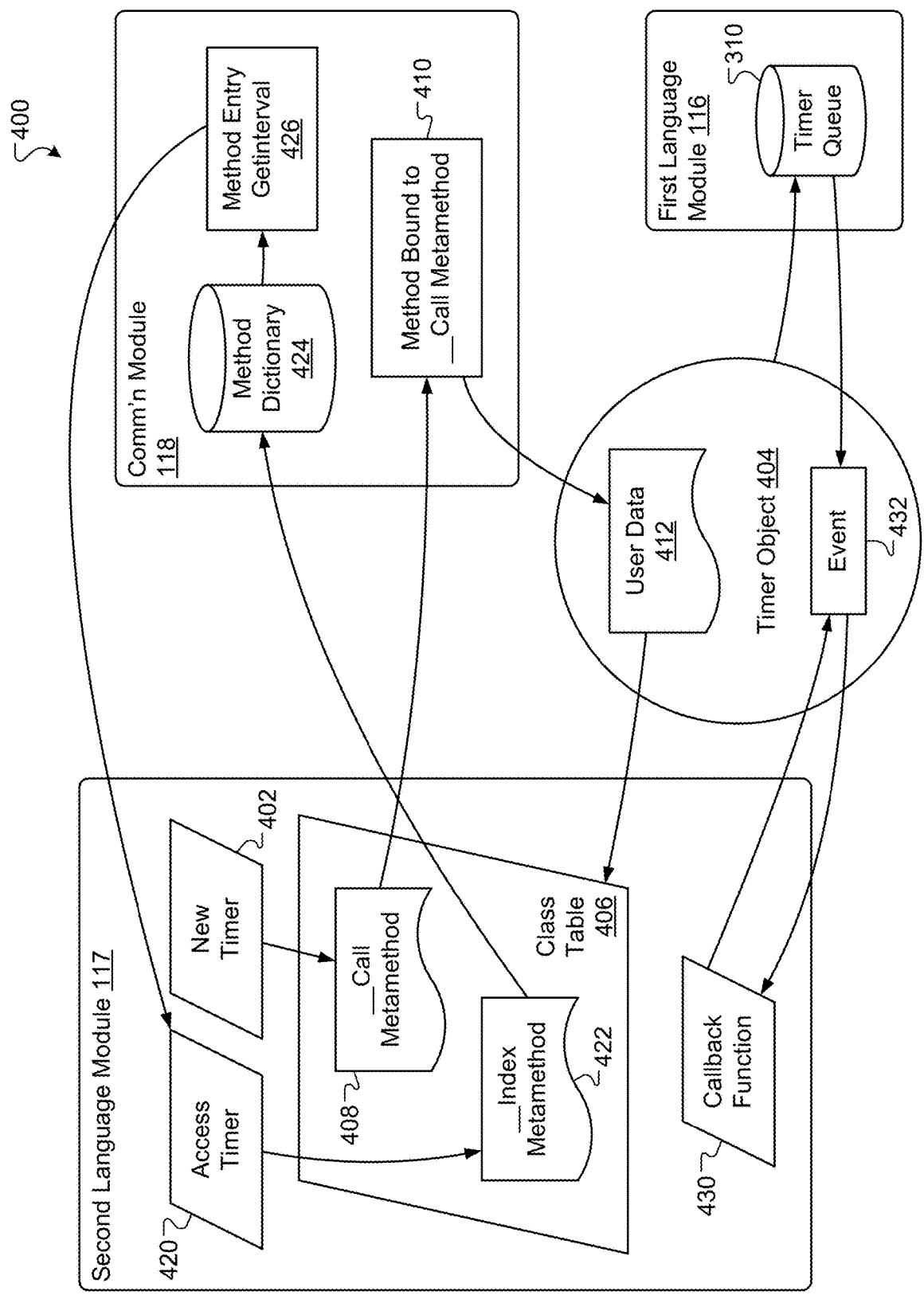
FIG. 4 is a schematic diagram of an example system for creating a timer object that can be accessed on a computing device by environments using disparate computer languages.

FIG. 4 illustrates an example system 400 in which an object is implemented and accessed from Lua and C++ environments. The object in this example is a timer; however, it is understood that many other types of objects (e.g., UI elements) can be implemented and accessed by both environments.

In a first operation, a Lua instruction in the second language module 117 executes a Lua new timer function 402 (e.g., a function for a new timer, such as ix.Timer( ) in Lua) to request creation of an instance of a timer object 404 (e.g., from class Timer in C++). The Lua new timer function 402 finds a Lua table associated with the new timer function 402 in a Lua class table 406 (e.g., containing all instance methods of a class), and Lua executes a "_call" metamethod from a metatable 408 assigned to the new timer function 402. The _call metamethod can be bound to a C++ closure 410 or method (e.g., in the communication module 118) that executes a C++ instruction to instantiate the new timer object 404. Upon construction of the timer object 404, the timer object 404 can be added to the timer queue 310 in the first language module 116 (e.g., the game engine). The first language module 116 can monitor the status of the timer object 404 in the timer queue 310, for example, to determine when the timer object 404 or associated timer expires. Lua userdata 412 containing a type identifier (ID) and a memory address of the timer object 404 can be constructed (e.g., by the method 410) and returned to Lua (e.g., the Lua class table 406) as a result of the new timer function 402. A metatable 422 for the userdata 412 can be set to be the new timer function 402, so all timer methods called on timer object 404 will be executed using an "_index" metamethod for the timer object 404. For example, the metatable 422 can be bound to the userdata 412, so that lambdas in a dictionary used by a closure bound to the _index metamethod for the timer object 404 can allow the userdata 412 access to C++ registered timer methods. In some implementations, the Lua class table 406 can own or be attached to a metatable having a _call metamethod and/or an _index metamethod as elements.

In a second operation, a Lua instruction executes a Lua access timer function 420 (e.g., timer:getInterval( )) to request access to the timer object 404, for example, to determine a status or property value of the timer object 404, to stop the timer object 404, to reset or adjust the timer object 404, and/or to see when or how often the timer object 404 will fire its expiration event. To access the timer object 404, the access timer function 420 can call a getInterval( ) method associated with the timer object 404 and/or its memory address. Calling the getInterval( ) method can execute an "_index" method in the metatable 422 for the timer object 404. This can execute a C++ method within a registration object to look up in a dictionary of registered lambdas or methods 424 to find a wrapped C++ method or closure 426 associated with or having, in this case, a "getInterval" key. The dictionary of registered methods 424 can include descriptions of methods associated with objects, including descriptions of the method inputs and outputs. The C++ closure 426 containing the userdata from the timer object 404 and the lambda can be executed to call the C++ method (e.g., Timer::getInterval( )) for the timer object 404, and the result can be returned to Lua for evaluation, printing, etc.

In a third operation, a Lua callback function 430 that a user wants to execute in response to a timer expiring can be added to an event 432 owned by the timer object 404. The first language module 116 can monitor the timer object 404 or an associated timer and, when the first language module 116 determines that the timer's interval has elapsed, the first language module 116 can trigger or fire the event 432 (e.g., the event owned by the timer object, identified as "onTimer") in the timer object 404. The firing of the event 432 can execute the callback function 430 and any other callback functions that have been added to the event 432. Additionally or alternatively, the event 432 can support a C++ callback, which can be executed upon expiration of the timer. The callback function 430 can be implemented in response to a request from the Lua access timer function 420. For example, the access timer function 420 can execute the "_index" method (e.g., in the metatable 422), which can access the registered methods 424 to create the callback function 430.

In general, the first operation described above involves using a first language environment (e.g., Lua) to request creation of a new object by a second language environment (e.g., C++). The second language environment creates the new object (a timer in this example) and passes back to the first language environment a type ID and a memory address for the new object. In the second operation, the first language environment can access the new object at the provided or instantiated memory address. The second language environment can access the new object, as needed, to provide requested information (e.g., regarding object status) to the first language environment. In the third operation, the second language environment monitors the object and informs the first language environment when an event associated with the object occurs. The first language environment can execute a function or method associated with the occurrence of the event.

In various examples, reference counting and garbage collection systems of the two language environments (e.g., Lua and C++) can be coordinated, such that an object can be deleted or can automatically dispose of itself once neither environment requires further access. Considering the timer object example again, such objects can be created by either Lua or C++ code. The processing of the timer's expiration event can be performed in C++ code, within an update queue (e.g., the timer queue 310). At the same time, the callback registered with the expiration event may have come from Lua. As such, there can be a period of time when both environments have access to the timer. In preferred examples, the timer object or other similar object is not deleted until neither environment requires further access to the object. In general, a reference count for a language environment can be a number of references, pointers, or handles to an object from the language environment. When multiple language environments are accessing an object, a total reference count for the object can be a sum of the reference counts for all the environments that are accessing the object. In some examples, an object is removed or disposed of only when the total reference count is zero or goes from non-zero to zero.

Each language environment can use reference counting to determine or maintain an interest in an object. For example, when a timer object is created (e.g., using the example Lua code presented above) and the object (e.g., ix.Timer) is assigned to a local variable t, Lua's internal reference count to the object can be 1 (one). Because 't' is a local variable, once the above example code goes out of scope, the internal Lua reference count can be decreased to 0, and the object can be garbage collected. This can invoke the "_gc" metamethod for the object, which, in most cases, disposes of the object.

Likewise, in the C++ environment, the timer object can have an initial C++ reference count of 0 when the timer object is first created. Adding the timer object to the update queue can increase the reference count to 1. Once the timer's duration has elapsed, the expired timer object can be removed from the update queue and the reference count can be decreased back to 0. At this point, without any other reference, the timer object may be deleted. To prevent premature deletion of an object by either environment, the two environments can coordinate with one another.

In various implementations an object can be maintained until both environments are no longer accessing the object or have no further involvement with the object. Reference counting coordination between the two environments can be performed using various elements. For example, a handles dictionary can be constructed using the object's memory address as a key, and the reference count can be incremented or decremented each time the Lua reference count for an object is modified through Lua's API. The handles dictionary can be or include a hashtable or hashmap that stores a value that can be referenced by a key. In this case, the handles dictionary can store the object's memory address as the key, and the value for the key can be the number of references (usages) of that key by the Lua code. In some implementations, the API can be provided to specify an "addReference( )" and "removeReference( )", a pair of C++ functions, for each class registered. As mentioned herein, there are three Lua API metamethods to which instructions can be added when a class is registered. Two relevant methods here are the _call( ) method and the _gc( ) method. Incorporating these elements into the above example for the timer object, the effect can be seen on both reference counting systems in Table 1.

TABLE 1

Reference counts for the language environments.

| Event | Lua Reference Count | C++ Reference Count | Total Reference Count |
| --- | --- | --- | --- |
| Instantiate C++ timer object | 0 | 0 | 0 |
| Add timer object to the C++ update queue. | 0 | 1 | 1 |
| Return timer (as a result of _call( )) to be assigned to 't' in Lua. | 1 | 1 | 2 |
| Call the timer's C++ addReference( ) function, as per the timer object's class registration, to account for the existence of a reference to the timer object | 1 | 2 | 3 |
| Lua local variable 't' goes out of scope, such that 't' is no longer valid or accessible | 0 | 2 | 2 |
| Because Lua has no further references, the _gc( ) metamethod causes removeReference( ) to be called (via the handles dictionary), as per the timer object's class registration. At this point, the timer's duration has elapsed, and the expiration event has fired. | 0 | 1 | 1 |
| The timer is removed from the update queue, decrementing its C++ reference. On transition to a 0 C++ reference count (which happened after Lua also indicated its access was no longer needed), the object can now be safely disposed or destructed. | 0 | 0 | 0 |

It is noted that the exemplary functions, methods, objects, events, and the like discussed above are merely for purposes of illustration and not limitation. The present invention can be used with any suitable computer languages and any appropriate functions, methods, objects, events, and the like, depending on the application. While much of the subject matter described herein relates specifically to the C++ and Lua computer languages, for example, it is understood that the subject matter can also apply to other computer languages and combinations thereof. For example, certain implementations of the subject matter described herein can be used to enable communication between any two or more of the following computer languages: PHP, Lua, C, C++, ERLANG, PYTHON, PASCAL, PERL, JAVA, RUBY, JAVASCRIPT, C#, OBJECTIVE-C, and SQL. Other computer languages are possible. In some instances, for example, C++ and JAVASCRIPT can be linked using JAVASCRIPT's prototype mechanism, which can take the place of Lua's metatables. In general, two languages can be linked by utilizing the registration mechanism on the primary language type, data lifecycle management, and/or event handling, as described herein.

Additionally, while certain examples described herein relate specifically to objects that are timers, it is understood that other types of objects can be created and accessed by the language environments. The objects can be, include, or define, for example, one or more items or conditions in a virtual environment for a computer game or other application. For example, the objects can include dates, files, graphical user interface (GUI) windows, graphical elements (e.g., polygons, lights, or textures), or other types of objects that can be instantiated or manipulated in a secondary language.

Figure 5:
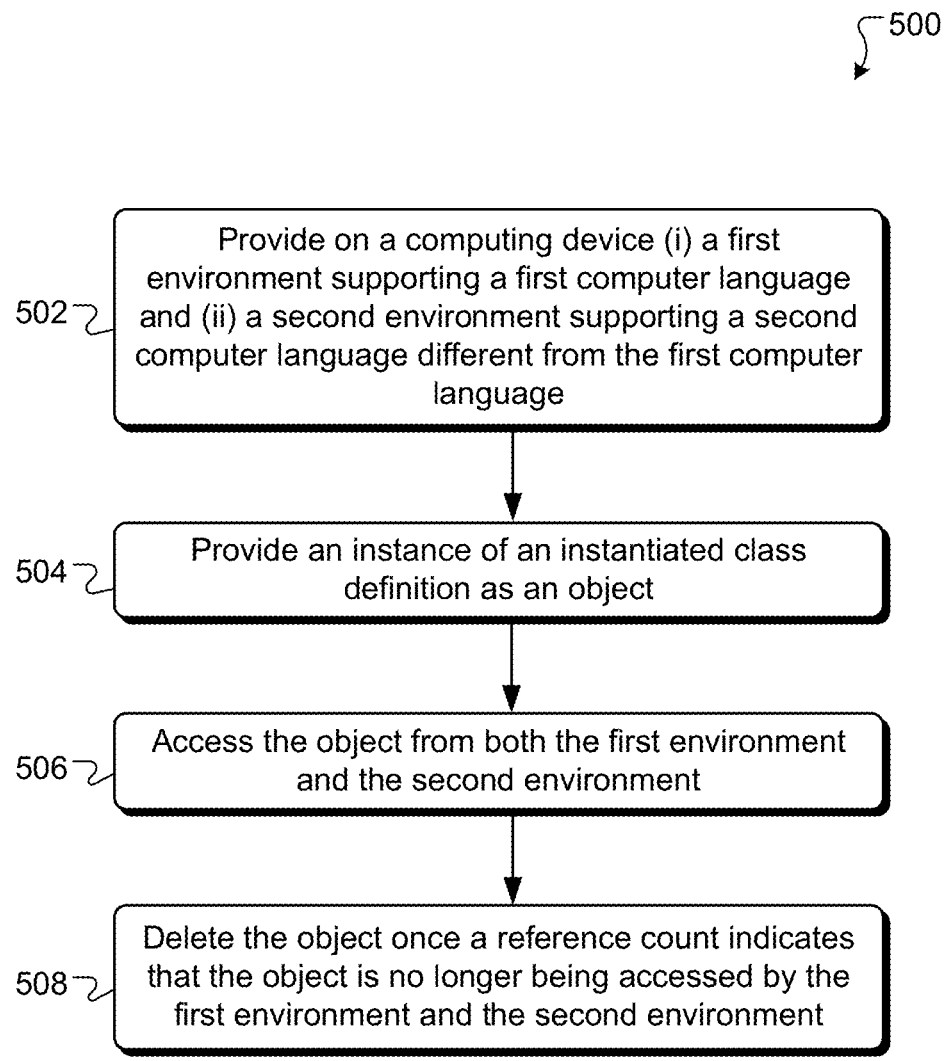
FIG. 5 is a flowchart of an example method of enabling communications between disparate computer languages on one or more computing devices.

FIG. 5 illustrates an example computer-implemented method 500 of enabling communication between two disparate computer languages on a computing device. The method includes providing (step 502) on a computing device (i) a first environment supporting a first computer language and (ii) a second environment supporting a second computer language different from the first computer language. An instance of an instantiated class definition as an object is provided (step 504). The object is accessed (step 506) from both the first environment and the second environment. The object is deleted (step 508) once a reference count indicates that the object is no longer being accessed by the first environment and the second environment, for example, because there are no references to the object remaining in either the first environment or the second environment.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method, comprising:
   providing on a computing device (i) a first environment supporting a first computer language and (ii) a second environment supporting a second computer language different from the first computer language;
   providing an instance of an instantiated class definition as an object,
      wherein providing the instance of the instantiated class definition as the object comprises:
         using the first environment supporting the first computer language to allocate memory for the object; and
         sending a memory address for the object from the first environment supporting the first computer language to the second environment supporting the second computer language;
   accessing the object from both the first environment supporting the first computer language and the second environment supporting the second computer language,
      wherein the object is modifiable by both the first environment supporting the first computer language and the second environment supporting the second computer language; and
   deleting the object once a reference count for the object indicates that the object is no longer being accessed by both the first environment supporting the first computer language and the second environment supporting the second computer language,
      wherein deleting the object comprises constructing a handles dictionary using a memory address for the object as a key and a number of references for the object as a value for the key,
      wherein the handles dictionary coordinates reference counting between the first environment supporting the first computer language and the second environment supporting the second computer language to prevent premature deletion of the object,
      wherein the first computer language comprises a plurality of functions,
      wherein a first subset of the plurality of functions has been registered to be reachable by both the first computer language and the second computer language, and
      wherein a second subset of the plurality of functions has not been registered and is reachable by the first computer language but not reachable by the second computer language.

2. The method of claim 1, wherein the computing device comprises a client device for an online game or a server for an online game.

3. The method of claim 1, wherein the first computer language comprises a programming language and the second computer language comprises a scripting language.

4. The method of claim 1, wherein accessing the object from both the first environment supporting the first computer language and the second environment supporting the second computer language comprises:
   accessing an identical memory address for the object from both the first environment supporting the first computer language and the second environment supporting the second computer language.

5. The method of claim 1, wherein accessing the object from both the first environment supporting the first computer language and the second environment supporting the second computer language comprises:
   identifying the object as a specific type from both the first environment supporting the first computer language and the second environment supporting the second computer language.

6. The method of claim 1, wherein providing the instance of the instantiated class definition as the object is performed from one of the first environment supporting the first computer language and the second environment supporting the second computer language, and wherein accessing the object from both the first environment supporting the first computer language and the second environment supporting the second computer language is performed from a different one of the first environment supporting the first computer language and the second environment supporting the second computer language.

7. The method of claim 1, wherein accessing the object from both the first environment supporting the first computer language and the second environment supporting the second computer language comprises:
   using the first environment supporting the first computer language to determine that an event associated with the object has occurred;
   using the first environment supporting the first computer language to inform the second environment supporting the second computer language about the occurrence of the event associated with the object; and
   executing a callback function in the second environment supporting the second computer language in response to the occurrence of the event associated with the object.

8. The method of claim 1, wherein the reference count for the object comprises a number of at least one of references, pointers, or handles to the object from both the first environment supporting the first computer language and the second environment supporting the second computer language.

9. The method of claim 1, wherein the first environment supporting the first computer language comprises a game engine for an online game and the second environment supporting the second computer language comprises a game manager for the online game.

10. A system, comprising:
   one or more computer processors programmed to perform operations comprising:
      providing on a computing device (i) a first environment supporting a first computer language and (ii) a second environment supporting a second computer language different from the first computer language;
      providing an instance of an instantiated class definition as an object,
         wherein providing the instance of the instantiated class definition as the object comprises:
            using the first environment supporting the first computer language to allocate memory for the object; and
            sending a memory address for the object from the first environment supporting the first computer language to the second environment supporting the second computer language;
         accessing the object from both the first environment supporting the first computer language and the second environment supporting the second computer language,
            wherein the object is modifiable by both the first environment supporting the first computer language and the second environment supporting the second computer language; and
         deleting the object once a reference count for the object indicates that the object is no longer being accessed by both the first environment supporting the first computer language and the second environment supporting the second computer language,
            wherein deleting the object comprises constructing a handles dictionary using a memory address for the object as a key and a number of references for the object as a value for the key,
            wherein the handles dictionary coordinates reference counting between the first environment supporting the first computer language and the second environment supporting the second computer language to prevent premature deletion of the object,
            wherein the first computer language comprises a plurality of functions,
            wherein a first subset of the plurality of functions has been registered to be reachable by both the first computer language and the second computer language, and
            wherein a second subset of the plurality of functions has not been registered and is reachable by the first computer language but not reachable by the second computer language.

11. The system of claim 10, wherein the first computer language comprises a programming language and the second computer language comprises a scripting language.

12. The system of claim 10, wherein accessing the object from both the first environment supporting the first computer language and the second environment supporting the second computer language comprises:
   accessing an identical memory address for the object from both the first environment supporting the first computer language and the second environment supporting the second computer language.

13. The system of claim 10, wherein accessing the object from both the first environment supporting the first computer language and the second environment supporting the second computer language comprises:
   identifying the object as a specific type from both the first environment supporting the first computer language and the second environment supporting the second computer language.

14. The system of claim 10, wherein providing the instance of the instantiated class definition as the object is performed from one of the first environment supporting the first computer language and the second environment supporting the second computer language, and wherein accessing the object from both the first environment supporting the first computer language and the second environment supporting the second computer language is performed from a different one of the first environment supporting the first computer language and the second environment supporting the second computer language.

15. The system of claim 10, wherein accessing the object from both the first environment supporting the first computer language and the second environment supporting the second computer language comprises:
   using the first environment supporting the first computer language to determine that an event associated with the object has occurred;
   using the first environment supporting the first computer language to inform the second environment supporting the second computer language about the occurrence of the event associated with the object; and
   executing a callback function in the second environment supporting the second computer language in response to the occurrence of the event associated with the object.

16. The system of claim 10, wherein the reference count for the object comprises a number of at least one of references, pointers, or handles to the object from both the first environment supporting the first computer language and the second environment supporting the second computer language.

17. The system of claim 10, wherein the first environment supporting the first computer language comprises a game engine for an online game and the second environment supporting the second computer language comprises a game manager for the online game.

18. An article, comprising:
   a non-transitory computer-readable medium having instructions stored thereon that, when executed by one or more computer processors, cause the one or more computer processors to perform operations comprising:
      providing on a computing device (i) a first environment supporting a first computer language and (ii) a second environment supporting a second computer language different from the first computer language;
      providing an instance of an instantiated class definition as an object,
         wherein providing the instance of the instantiated class definition as the object comprises:
            using the first environment supporting the first computer language to allocate memory for the object; and
            sending a memory address for the object from the first environment supporting the first computer language to the second environment supporting the second computer language;
      accessing the object from both the first environment supporting the first computer language and the second environment supporting the second computer language,
         wherein the object is modifiable by both the first environment supporting the first computer language and the second environment supporting the second computer language; and
      deleting the object once a reference count for the object indicates that the object is no longer being accessed by both the first environment supporting the first computer language and the second environment supporting the second computer language,
         wherein deleting the object comprises constructing a handles dictionary using a memory address for the object as a key and a number of references for the object as a value for the key,
         wherein the handles dictionary coordinates reference counting between the first environment supporting the first computer language and the second environment supporting the second computer language to prevent premature deletion of the object,
         wherein the first computer language comprises a plurality of functions,
         wherein a first subset of the plurality of functions has been registered to be reachable by both the first computer language and the second computer language, and
         wherein a second subset of the plurality of functions has not been registered and is reachable by the first computer language but not reachable by the second computer language.

* * * * *